Jan. 20, 1948.   P. R. POWELL   2,434,864
APPARATUS FOR DETECTING IMPERFECTIONS IN FILAMENTARY MATERIALS
Filed July 11, 1946   2 Sheets-Sheet 1
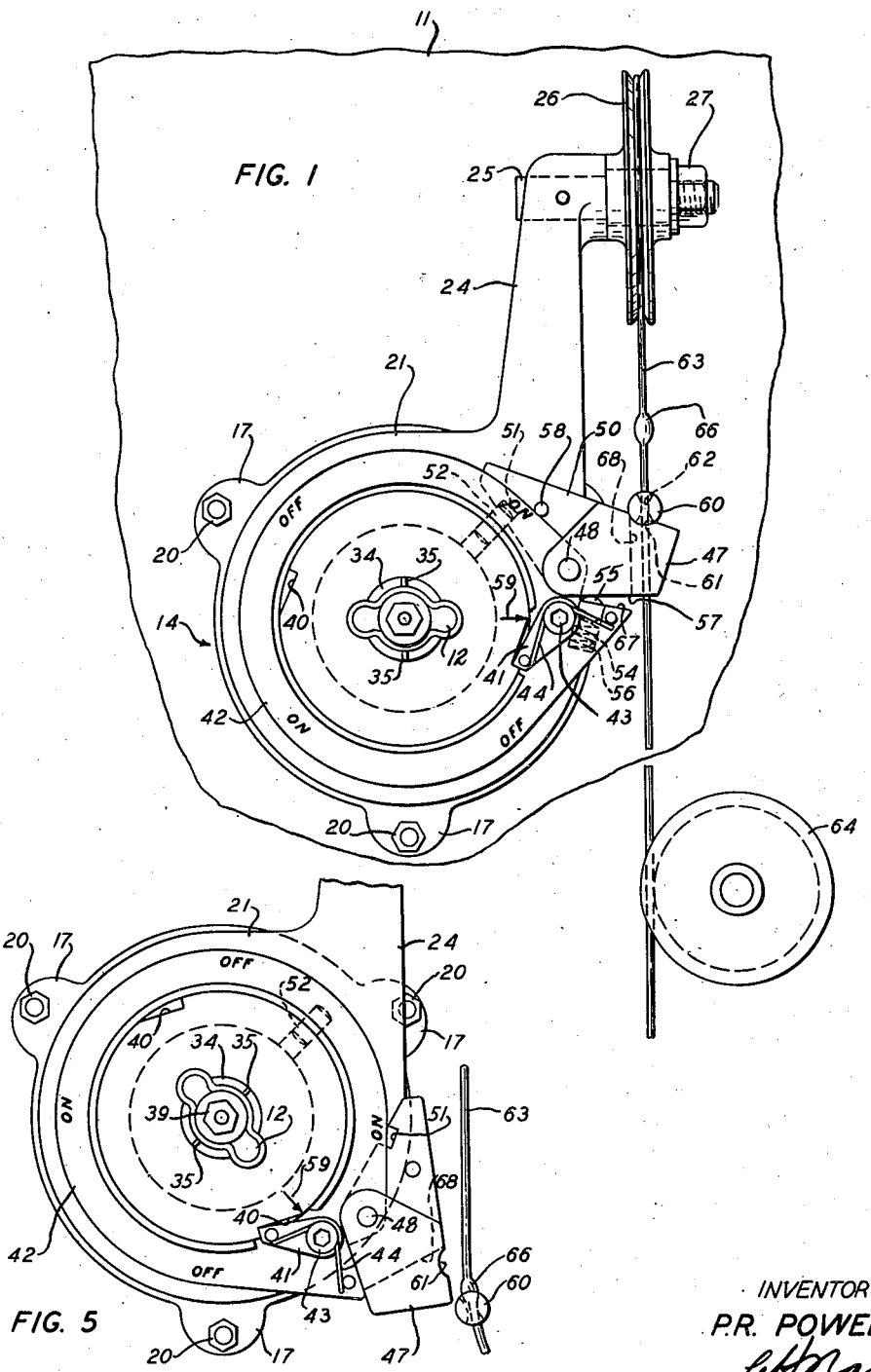
INVENTOR
P.R. POWELL
BY
ATTORNEY Jan. 20, 1948.  P. R. POWELL  2,434,864
APPARATUS FOR DETECTING IMPERFECTIONS IN FILAMENTARY MATERIALS
Filed July 11, 1946  2 Sheets-Sheet 2
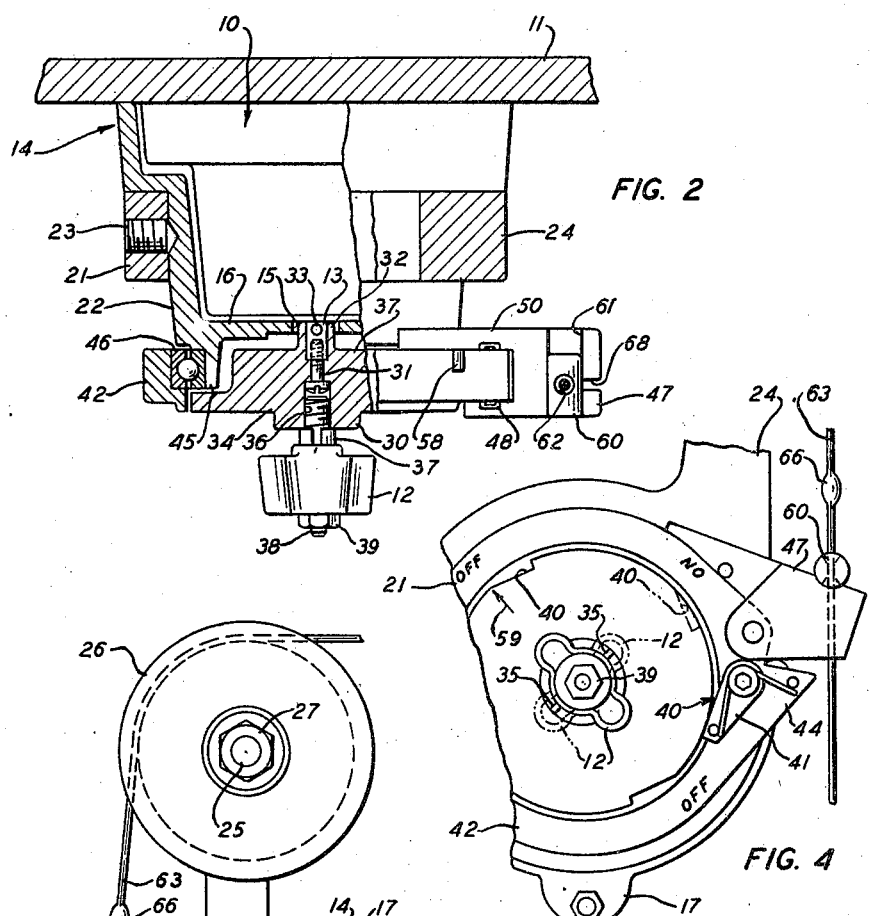
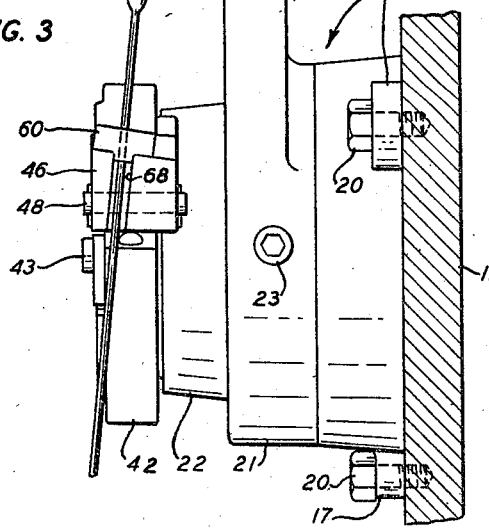
INVENTOR
P.R. POWELL
BY
ATTORNEY Patented Jan. 20, 1948

2,434,864

UNITED STATES PATENT OFFICE 2,434,864

APPARATUS FOR DETECTING IMPERFECTIONS IN FILAMENTARY MATERIALS

Paul R. Powell, Baltimore, Md., assignor to Western Electric Company, Incorporated, New York, N. Y., a corporation of New York Application July 11, 1946, Serial No. 682,891

13 Claims. (Cl. 66—166)

This invention relates to apparatus for detecting imperfections in filamentary materials, and more particularly to apparatus for stopping the operation of knitting machines, braiding machines, or the like, when a knot or other enlargement occurs in a strand being operated upon thereby.

In general, textile insulating machines such as knitting machines or braiding machines are used to apply a textile covering on a continuously advancing insulated conductor and are usually driven by an electric motor controlled by a manually operable electric switch mounted in a readily accessible position on the machine. Occasionally, such machines produce a defective covering on the conductor, that is, a knot or lump is formed on the covering, causing the overall diameter of the conductor at such points to exceed normal manufacturing variations. In order to prevent the particular machine involved from continuing to produce such a defective covering, it has been suggested that the conductor, after being treated by such machines, be advanced through an inspection station which serves to detect the presence of such defects and stop the machine when the first occurrence of such defects reaches the inspection station.

Various types of conductor inspection stations have been employed in the past on such machines, but they usually require the use of additional switching means in conjunction with the switching means provided for manually controlling the operation of the machine. Obviously, it is very desirable to incorporate an automatic inspection station and a manually operable electric control means into a single unit, whereby the machine may be manually controlled as desired, and automatically responsive to the presence of defects in the covering being formed on the conductor.

An object of the invention is to provide new and improved apparatus for detecting imperfections in filamentary materials.

Another object of the invention is to provide knot or lump detecting apparatus which will automatically operate the manually operable electric control means normally provided on a knitting or braiding machine.

In accordance with a specific embodiment of the invention, a latch plate is attached to the shaft of a conventional rotary type electric switch, and has a winged lever secured thereto to provide normal manual operation of the switch and latch plate. The latch plate serves to latch the toggle action of the switch in a critical near-off position to a movable tripping ring. The tripping ring serves to support the size-gauge in a normal operating position while a filamentary conductor is being advanced therethrough. When a defect occurs in the conductor being inspected thereby, the defect engages the size-gauge and carries it downwardly, which rotates the tripping ring and latch plate as a unit to turn the switch to its off position thereby preventing further operation of the machine.

A clear understanding of the invention may be had from the following detailed description of a specific embodiment thereof, when read in conjunction with the appended drawings, in which:

Fig. 1 is a front elevation of a preferred form of the apparatus forming a specific embodiment of the invention and shows the apparatus in a normal operating position;

Fig. 2 is a plan view of the apparatus having portions thereof broken away;

Fig. 3 is a right side view of the apparatus shown in Fig. 1;

Fig. 4 is a fragmentary plan view showing the apparatus of Fig. 1 in a normal off position, and Fig. 5 is a fragmentary front elevation showing a portion of the apparatus in its actuated position.

Referring to Fig. 2 of the drawings, a conventional rotary type electric snap switch indicated generally at 10, is mounted in a readily accessible position on a textile insulating machine, a portion of which machine is indicated generally at 11. The snap switch 10 is usually employed as a manual "start-stop" control station for controlling the operation of textile insulating machines, and is usually provided with a resilient toggle action "make and break" switch mechanism (not shown). The snap switch requires only a quarter turn (90°) on the winged lever 12 secured to a shaft 13 to actuate the switch mechanism from an "off" position to an "on" position, or vice versa, in which case the snap switch has two "on" positions and two "off" positions for one complete revolution (360°) of the lever 12. A housing 14 is positioned over the switch 10 so that the switch shaft 13 extends through a bore 15 provided in a face 16 of the housing. The housing 14 is provided with a plurality of semi-circular lugs 17—17, by means of which the housing is secured to the portion 11 of the insulating machine by bolts 20—20 threadedly secured in the wall portion 11. A support 21 is rigidly secured to a body portion 22 of the housing 14 by a plurality of set screws 23—23 and is provided with an integral arm 24 on the end of which is secured a pin 25. A guide pulley 26 is rotatably mounted on the pin 25 and secured thereon by a nut 27 threadedly mounted on the end of the pin 25 (Fig. 1).

A circular latch plate 30 is secured on the end of the switch shaft 13 by a screw 31 which is threadedly mounted in a tapped hole provided in the switch shaft 13. The inner face of the latch plate 30 is provided with a hub 32 which extends into the bore 15 and has a slot provided across the face of the hub for engaging a pin 33 transversely positioned on the switch shaft 13. In this manner the latch plate 30 is keyed directly to the switch shaft 13 and any rotary movement imparted to the latch plate 30 also turns the shaft 13 and the switch mechanism operated thereby. The outer face of the latch plate 30 is provided with a hub 34 having a central fin 35 which extends diametrically across the hub 34, except for that portion which is removed by a tapped bore 36 centrally provided in the latch plate 30. The fin 35 serves to engage a split hub 37 provided on the winged lever 12, which is positioned on the end of a stud 38 mounted in the tapped bore 36 and secured thereon by a nut 39 threadedly mounted on the end of the stud 38 (Fig. 2). The fin 35 serves to key the winged lever 12 to the latch plate 30, whereupon any rotary movement imparted to the winged lever 12 will turn the latch plate 30 and the switch shaft 13 keyed thereto.

The latch plate 30 is provided with a pair of diametrically opposed peripheral notches 40—40, which are engaged by a spring pressed pawl 41 pivotally mounted on a tripping ring 42 by means of a special stud 43 threadedly secured to the tripping ring. A torsion spring 44 is mounted under the head of the stud 43 and serves to urge the end of the pawl 41 against the periphery of the latch plate 30. The tripping ring 42 is rotatably mounted on a flange 45 provided on the housing 14 by means of an anti-friction bearing 46 pressed on the flange 45. An arm 47 (Fig. 1) is pivotally mounted on a pin 48 secured to the tripping ring 42 and is provided with an elongated leg 50 having a notch 51 cut in the underside thereof to receive the end of a pin 52 rigidly secured in the body portion 22 of the housing 14. A spring 54 and a ball 55 are positioned in a bore 56 (Fig. 1) provided in the tripping ring 42, the spring 54 serving to urge the ball 55 against a bottom portion 57 of the arm 47. This ball and spring arrangement serves to maintain the notch 51 in engagement with the end of the pin 52 to the extent permitted by a stop pin 58 secured in the leg 50 of the arm 47. The leg 50 serves to latch the tripping ring 42 in its normal operating position, as shown in Fig. 1, in which position the arm 47 is maintained in a substantially transverse position with respect to the ring 42. The spring 44 causes the pawl 41 to engage the notches 40—40 provided in the periphery of the latch plate 30 and thereby latch the plate 30 and the switch 10 to the tripping ring 42. A pair of diametrically opposed "on" indicia and a pair of diametrically opposed "off" indicia are provided on the outer face of the tripping ring 42 adjacent to the inner periphery thereof and are equidistantly spaced therearound with respect to each other. An index arrow 59 is provided adjacent to the periphery of the latch plate 30, for the purpose of indicating when the switch 10 is in the "on" or "off" position with respect to the tripping ring 42.

A size-gauge 60 is movably positioned in a groove 61 provided in the top surface of the arm 47 and has a conical bore 62 designed to slidably engage a filamentary conductor, such as a conductor 63, to be inspected thereby. When the "make and break" mechanism of the switch 10 is in the "off" position, the handle 12 and notches 40—40 assume an oblique position as shown in Fig. 4. In this "off" position the index arrow 59 is opposite the upper "off" indicia, and the pawl 41 merely abuts the periphery of the latch plate 30 (Fig. 4). When the winged lever 12 is turned 90° in a clockwise direction to snap the switch mechanism in the "on" position, the index arrow 59, shown dotted in Fig. 4, is now directly opposite the upper "on" marking, and the upper notch 40 of the latch plate 30 has been moved closer to the pawl 41. When the switch 10 is turned to the "on" position, it energizes a motor (not shown) which drives the insulating machine and a capstan 64 which advances the filamentary conductor 63 from a supply (not shown) through the textile insulating machine, over the guide pulley 26, and through the bore 62 of the size-gauge 60. The filamentary conductor passes around the capstan several times and thence to suitable takeup means (not shown). After the apparatus has been put in operation, the lever 12 is further rotated in a clockwise direction until the upper notch 40 is engaged by the spring pressed pawl 41, in which case the switch 10 is latched to the tripping ring 42 in a critical "near-off" position, as shown in Fig. 1. In other words, the toggle mechanism of the switch 10 has been set very near the tripping point, whereby only a very slight turn of the latch plate 30 will cause the mechanism to snap over to its "off" position, and deenergize the motor driving the capstan 64. The index arrow 59 now assumes a mid-position between the upper "on" indicia and the lower "off" indicia provided on the tripping ring 42.

The filamentary conductor 63 may contain an imperfection such as a lump indicated generally at 66, which would not pass through the bore 62 of the size-gauge 60. The lump 66 engages the size-gauge and carries it downward, thereby causing the arm 47 to be rotated about the pin 48 against the action of the spring 54 and the leg 50 to be disengaged from the end of the pin 52. By the time the arm 47 has been rotated to this extent the bottom surface 57 engages a shoulder 67 provided on the tripping ring 42, whereupon the continued movement of the filament 63 serves to rotate the tripping ring 42 about the flange 45 of the housing 14 to the position shown in Fig. 4. The latch plate 30 is rotated therewith by virtue of the fact that the pawl 41 engages the notch 40, whereupon such rotation of the latch plate 30 causes the switch 10 to snap to its "off" position and deenergize the motor (not shown) driving the capstan 64, thereby preventing further movement of the filament 63. When the size-gauge has travelled to the position shown in Fig. 4 and rotated the tripping ring 42 to the position indicated, the size-gauge will slide off the end of the arm 47 by virtue of the fact that the end of the arm 46 is provided with a slot 68 through which the filament passes during normal operation of the apparatus.

The above-described apparatus operates in the following manner to inspect a filamentary conductor as it emerges from a textile insulating machine, such as a knitting machine or braiding machine:

The filamentary conductor 63 is taken as it emerges from the textile insulating machine and passed over the guide pulley 26, through the bore 62 provided in the size-gauge 60 and then around the capstan 64 several times to a suitable takeup means (not shown). The tripping ring 42 is rotated counterclockwise about the housing 14 until the notch 51 of the leg 50 engages the end of the pin 52 whereupon the spring 54 and ball 55 serve to latch the tripping ring 42 to the housing 14 in the position shown in Fig. 1. The size-gauge is properly positioned in the groove 61 provided on the end of the arm 47. Assuming that the index arrow 59 is positioned in the fourth quadrant, which is an "off" position of the switch 10, this adjustment of the tripping ring 42 places the upper "off" indicia directly opposite the index arrow 59. After these arrangements have been made, the lever 12 is turned in a clockwise direction, until the switch 10 snaps into its "on" position whereupon the index arrow 59 is advanced to a position directly opposite the upper "on" indicia. Since the switch 10 is electrically connected to the means for driving the particular machine which is operating upon the filamentary conductor 63 to be inspected, the conductor 63 is now advanced from the insulating machine over the guide pulley 26 and through the bore 62 provided in the size-gauge by the capstan 64.

Immediately upon starting the apparatus as described, the switch 10 is further actuated by the winged lever 12 until it reaches a position where it is about to snap into its normal "off" position. However, just before the full off position is reached, the notch 40 provided in the latch plate 30 is engaged by the spring pressed pawl 41 provided on the tripping ring 42, whereby the switch 10 is maintained in this critical near-off position during the continuous operation of the particular machine involved. This critical position of the switch 10 is maintained throughout the operation of the machine so that, when an imperfection appears on the filament emerging therefrom, it will carry the size-gauge downwardly and actuate the arm 47 so as to raise the leg 50 upwardly and disengage the notch 51 from the end of the pin 52. Further downward movement of the size-gauge 60, as caused by the imperfection 66, will then cause the tripping ring 42 to be rotated about the housing 14 and carry with it the latch plate 30 because of the engagement of the pawl 41 within one of the notches 40—40.

Since the switch 10 had been previously set to a near-off position prior to the engagement of the size-gauge 60 by the imperfection 66, only a very slight rotary movement of the latch 30 is required to completely trip the switch 10 and thereby deenergize the motor driving the particular machine involved and the capstan 64, whereupon further advancement of the filament 63 is prevented. The required amount of travel of the size-gauge 60 to completely trip the switch 10 is indicated by the position of the apparatus shown in Fig. 4, wherein it is readily noted that the latch plate 30 and the tripping ring 42 have travelled together through a relatively small arc to fully trip the switch 10 to its off position. It will also be noted in Fig. 4 that after the switch 10 is tripped, the size-gauge is free to slide off the end of the arm 47 and continue its movement until the machine coasts to a full stop, whereupon undue tension and possible breakage of the filamentary conductor are prevented.

The imperfection is removed from the conductor and the size-gauge 60 replaced on the uninspected portion of the conductor. The tripping ring is then rotated in a counterclockwise direction about the housing 14 until the notch 51 again engages the end of the pin 52. This adjustment of the tripping ring 42 places the lower "off" indicia directly opposite the index arrow 59 on the latch plate 30. The apparatus is placed in operation by turning the lever 12 in a clockwise direction until the index arrow 59 is directly opposite the lower "on" indicia, whereupon the conductor 63 is again advanced through the size-gauge. Then the lever 12 is further actuated in the same direction until the pawl 41 engages one of the notches 40—40 of the latch plate 30, whereby the switch 10 is latched in a critical near-off position, and the index arrow 59 assumes a position midway between the lower "on" indicia and the upper "off" indicia. When an imperfection again occurs in the advancing conductor the apparatus is actuated thereby as described above to deenergize the motor driving the insulating machine and the capstan 64, and thereby prevent further operation of the machine until the tripping ring is reset to its normal operating position.

The above-described apparatus comprises a simple and efficient inspection station for automatically stopping a textile insulating machine when an imperfection appears in a conductor being inspected thereby.

What is claimed is:

1. An apparatus for detecting imperfections in filamentary materials, which comprises a size-gauge having a bore substantially equal to the diameter of the filament being inspected thereby, means for advancing a filament through said size-gauge bore, manually operable switching means for controlling the operation of the filament advancing means, means for latching the switching means in a near-off position when the filament is being advanced through the size-gauge bore, and means associated with the size-gauge for releasing the latching means and for automatically actuating the switching means to a full-off position when the filament being inspected contains an imperfection which will not pass through the size-gauge bore.

2. An apparatus for inspecting for and detecting imperfections in filamentary materials, which comprises a size-gauge for slidably engaging a filament to be inspected thereby, means for advancing a filament past the size-gauge, a rotary snap switch for manually controlling the operation of the filament advancing means, means associated for automatically tripping the switch to its off position when an imperfection on the advancing filament engages the size-gauge, and means for latching the switch to the automatic tripping means when the filament is being advanced by the advancing means.

3. An apparatus for detecting imperfections in filamentary materials, which comprises a size-gauge for slidably engaging a filament to be inspected thereby, means for advancing a filament through said size-gauge, movable means for supporting the size-gauge against movement by the advancing filament, manually operable switching means for controlling the operation of the filament advancing means, and means associated with the size-gauge supporting means for latching the switching means in a critical near-off position after said switching means has been actuated to its on position to energize the filament advancing means.

4. An apparatus for detecting imperfections in filamentary materials, which comprises a size-gauge provided with a bore designed to slidably engage a filament to be inspected thereby, means for advancing a filament through said size-gauge bore, means for normally supporting the size-gauge in a substantially transverse position with respect to the advancing filament, manually operable switching means for controlling the operation of the filament advancing means, means associated with said size-gauge supporting means for automatically tripping said switching means to its off position when an imperfection on the filament engages the size-gauge, and means for latching the switching means to the automatic tripping means after the switching means has been actuated to its on position to energize the filament advancing means.

5. An apparatus for inspecting for and detecting imperfections in filamentary materials, which comprises manually operable switching means, means for latching the switching means in a critical near-off position, a size-gauge for detecting imperfections in the filament, means electrically associated with said switching means for advancing a filament through said size-gauge when the switching means is latched in the near-off position, and tripping means associated with said size-gauge for automatically actuating the latching means and tripping the switching means when a filament being inspected contains an imperfection which will not pass through the size-gauge, whereby further advancement of the filament is prevented.

6. An apparatus for inspecting for and detecting imperfections in filamentary materials emerging from textile insulating machines, which comprises manually operable switching means for controlling the movement of a filament being inspected, means secured thereto for latching the switching means in a critical operating position, a size-gauge for detecting imperfections in the advancing filament, means associated with the switching means for advancing the filament through the size-gauge when the controlling means is latched in the critical operating position, means for supporting the size-gauge in a transverse position with respect to the advancing filament, said supporting means serving to maintain the latching means in a normal operating position and means for permitting the size-gauge to slide off the end of the supporting means when the size-gauge is engaged by an imperfection in the advancing filament, whereby undue tension and possible breakage of the moving filament is averted.

7. An apparatus for detecting imperfections in filamentary materials, which comprises a manually operable electric switch for controlling the movement of a filament to be inspected, means for latching the switch in an operating position, a size-gauge for detecting imperfections in the filament being inspected, means for advancing a filament through the size-gauge, means for supporting the size-gauge in a substantially transverse position with respect to the conductor, said supporting means serving to maintain the latching means in an operating position, whereby when the moving filament contains an imperfection which will not pass through the size-gauge the supporting means actuates the latching means thereby causing the switch to be actuated and further advancement of the filament is prevented.

8. An apparatus for detecting imperfections in filamentary materials, which comprises manually operable rotary snap switch for controlling the movement of a filament to be inspected, a latching means secured to and operable with said rotary switch, said latching means serving to latch the rotary switch in a critical operating position, a size-gauge for detecting imperfections in the filament being inspected, means for supporting the size-gauge in a transverse position with respect to the advancing filament, and resilient means for maintaining the supporting means in its normal operating position against movement by the filament advancing through the size-gauge and against the thrust caused by allowable manufacturing variations which occur in the filament being inspected, said supporting means being actuated only when imperfections occur in the filament being inspected which will not pass through the size-gauge supported thereby.

9. An apparatus for detecting imperfections in filamentary materials, which comprises a size-gauge having a bore substantially equal to the diameter of the filament being inspected thereby, means for advancing a filament through said size-gauge bore, movable means for supporting said size-gauge against movement by the advancing filament, rotatable means for latching said size-gauge supporting means in a normal operating position, manually operable electric switching means for selectively controlling the filament advancing means, and means for latching the switching means to the rotatable means for latching the size-gauge supporting means in its normal operating position, said latching means serving to latch the switching means in a critical near-tripped position when the filament is being advanced through the size-gauge bore, whereby when the moving filament contains an imperfection which will not pass through said size gauge bore the supporting means is actuated causing the rotatable latching means and the switching means to its full tripped position which deenergizes the filament advancing means.

10. An apparatus for inspecting for and detecting imperfections in filamentary materials, which comprises means for detecting imperfections in a filament being inspected thereby, means for advancing a filament through said detecting means, a rotary snap switch for controlling the filament advancing means, means for automatically tripping the snap switch to its off position when an imperfection appears in the filament being inspected by the detecting means, means associated with the tripping means for supporting the detecting means against movement by the advancing filament, said supporting means serving to latch the tripping means in its normal operating position with respect to the advancing filament, and means for latching the snap switch in a critical near-tripped position to the tripping means when the filament is being advanced by said advancing means, whereby when an imperfection occurs in the advancing filament it engages the detector and actuates the supporting means thereby releasing the tripping means which is rotated sufficiently to trip the snap switch and prevent further advancement of the filament.

11. An apparatus for detecting imperfections in filamentary materials, which comprises a manually operable electric switch, a circular latch plate secured to the shaft of the switch and operable therewith, said latch plate being provided with a pair of peripheral notches, a tripping ring surrounding the latch plate and having provided thereon a pivotally mounted pawl which may selectively engage the notches provided in the latch plate, means for maintaining the tripping ring in its normal operating position, means for detecting imperfections in a filament being inspected, means associated with the switch for advancing the filament through the detecting means, said detecting means being resiliently supported by the tripping ring, whereby when the switch is actuated to advance the filament through the detecting means and further actuated to a near-off operating position it is maintained therein by the engagement of the pawl with the notch on the latch plate so that imperfections which occur in the filament being advanced through the detecting means will actuate the tripping ring and the switch beyond its critical near-off position to its full-off position and further advancement of the filament is prevented.

12. An apparatus for detecting imperfections in filamentary materials, which comprises a size-gauge for slidably engaging a filament to be inspected thereby, means for advancing a filament past the size-gauge, an electric snap switch for manually controlling the operation of the filament advancing means, means associated with the snap switch for automatically tripping the switch when the advancing filament contains an imperfection which will not pass through the size-gauge, and means associated with tripping means for supporting the size-gauge against movement by a normal advancing filament, said size-gauge supporting means being provided with a slot through which the filament is normally advanced so that when the filament contains an imperfection which will not pass through the size-gauge the size-gauge is free to slide off the end of the supporting means after the tripping means has been actuated and thereby prevent undue strain on the filament as it comes to a full stop.

13. An apparatus for inspecting a conductor emerging from a textile insulating machine, which comprises a size-gauge for slidably engaging a conductor to be inspected, means for advancing a conductor through the size-gauge, a manually operable snap switch for controlling the operation of the conductor advancing means, a housing positioned over the snap switch, a rotatable tripping ring rotatably mounted on said housing for automatically operating the snap switch when an imperfection occurs in the conductor, an arm pivotally mounted on the tripping ring for supporting the size-gauge against movement by the advancing conductor, said arm serving to latch the tripping ring to the housing in a normal operating position, a latch plate secured to the switch for latching the switch in a critical operating position to the tripping ring when the conductor is being advanced by the advancing means, and resilient means for normally maintaining the arm latched to the housing, whereby when an imperfection engages the size-gauge it actuates the arm against the action of the resilient means thereby releasing the tripping ring and rotates it sufficiently to actuate the switch latched thereto by the pawl provided on said tripping ring.

PAUL R. POWELL.

REFERENCES CITED

The following references are of record in the file of this patent:

UNITED STATES PATENTS

| Number | Name | Date |
|---|---|---|
| 1,423,398 | Connell et al. | July 18, 1922 |
| 2,190,169 | Bardsley | Feb. 13, 1940 |
| 2,329,427 | Vossen | Sept. 14, 1943 |
| 2,368,686 | Sperzel | Feb. 6, 1945 |
| 2,412,324 | Crum | Dec. 10, 1946 |